United States Patent [19]

Arnold

[11] Patent Number: 5,147,919
[45] Date of Patent: Sep. 15, 1992

[54] REINFORCING MATERIAL COMPRISING E-POLYCAPROLACTONE AND PULVERIZED FUEL ASH

[75] Inventor: Brian Arnold, Leicestershire, England

[73] Assignee: British United Shoe Machinery Ltd., Leicester, England

[21] Appl. No.: 365,340

[22] Filed: Jun. 13, 1989

[30] Foreign Application Priority Data

Jul. 1, 1988 [GB] United Kingdom ............... 8815688

[51] Int. Cl.$^5$ .............................................. C08K 3/34
[52] U.S. Cl. ................................................. 524/444
[58] Field of Search ...................... 524/443, 444, 450; 525/437

[56] References Cited

U.S. PATENT DOCUMENTS

| | | | |
|---|---|---|---|
| 4,368,288 | 1/1983 | Nield | 525/437 |
| 4,501,829 | 2/1985 | Oda et al. | 524/444 |
| 4,717,496 | 1/1988 | Brehmer et al. | 523/206 |

*Primary Examiner*—Paul R. Michl
*Assistant Examiner*—Tae H. Yoon
*Attorney, Agent, or Firm*—Owen J. Meegan; Aubrey C. Brine

[57] ABSTRACT

A reinforcing material comprises an E-polycaprolactone binder in admixture with a filler. Said filler is pulverized fuel ash, and said mixture comprises from 50 to 95% by weight of polycaprolactone, from 5 to 45% by weight of pulverized fuel ash and from 0 to 20% by weight of other fillers and/or diluents.

The reinforcing material is particularly suitable for the reinforcing and stiffening of materials for use in the manufacture of shoes.

8 Claims, No Drawings

REINFORCING MATERIAL COMPRISING E-POLYCAPROLACTONE AND PULVERIZED FUEL ASH

BACKGROUND OF THE INVENTION

This invention relates to an improved thermoplastic reinforcing material, which is particularly suitable for the reinforcing and stiffening of materials for use in the manufacture of shoes, and to a method of manufacture of the material.

Thermoplastic reinforcing materials are known and have been used for a long time in the footwear industry, and it is a disadvantage of these known materials that they must first be coated with an adhesive, such as a hot melt adhesive, before they can be bonded to the upper or lining material to be reinforced.

In European patent application no. 183,912 U.S. Pat. No. 4,717,496, a reinforcing material is described which consists of 30 to 80% by weight of filler and 70 to 20% by weight of binder, the particles of filler being formed entirely or at least on their surface of plastic and having a grain size distribution of 50 to 500 micron, and the binder being thermoplastic with adhesive properties in the temperature range 50° to 80° C. As used in connection with the filler, the term plastic is said to refer to those plastics which on the basis of their melt properties alone, are scarcely amenable, if at all, to processing into forms with a large surface area using powder technology methods. Particularly suitable plastics are said to include hard PVC particles and copolymers of vinyl chloride and an alpha-olefine or of styrene and butadiene or propenenitrile, butadiene and styrene. Suitable binders are said to include polycaprolactones, elastomeric polyurethenes, modified polyalkenes and ionomers.

The materials proposed in the European Patent Application demonstrate a number of disadvantages. In order to achieve the stiffness required for use in the footwear industry, it is necessary to use a relatively high weight loading of plastics or plastics coated filler, which increases the cost of the material. The plastics or plastics coated filler is relatively expensive, as it has to be ground to the grain size distribution specified, and it may be difficult to obtain.

It is an object of the present invention to provide a reinforcing material, which is particularly suitable for use in the footwear industry, in which the above disadvantages are reduced or substantially obviated.

BRIEF SUMMARY OF THE INVENTION

The present invention provides a reinforcing material which comprises a c-polycacprolactone binder in admixture with a filler, characterised in that the filler is pulverised fuel ash and the mixture comprises from 50 to 95% by weight of polycaprolactone, from 5 to 45% by weight of pulverised fuel ash and from 0 to 20% by weight of other fillers and/or diluents.

The reinforcing material according to the invention preferably comprises from 60 to 90% by weight of polycaprolactone, from 10 to 30% by weight of pulverised fuel ash and from 0 to 10% by weight of other fillers and/or diluents.

The polycaprolactone to be used in the materials according to the invention preferably has a particle size in the range of 50 to 500$\mu$, more preferably 100 to 400$\mu$, and preferably has a molecular weight in the range 40,000 to 60,000, more preferably about 50,000.

The pulverised fuel ash which is used as the filler in the reinforcing materials according to the invention is an aluminosilicate material which is produced as a by-product of power station operation. As supplied, the pulverised fuel ash has a particle size of below 350$\mu$, and is suitable for incorporation in the reinforcing materials according to the invention without further processing. It may, however, be desirable to refine the pulverised fuel ash by removing the finest particles, for example those of a particle size below 5$\mu$, in order to reduce the concentration of fine dust particles in the processing environment.

For ease of handling, the reinforcing materials according to the invention may be deposited as a layer of powder between two supporting layers, for example between two layers of scrim, in particular lightweight scrim, or between one layer of scrim, in particular a lightweight scrim, and one layer of lightweight non-woven material, for example a non-woven lining material, and then fused.

Alternatively, the reinforcing materials according to the invention may be deposited directly onto the shoe upper, in the desired configuration, and fused in situ. Such direct deposition can suitably be carried out using known powder deposition apparatus. The reinforcing materials according to the invention may also be extruded directly.

The reinforcing materials according to the invention may comprise from 0 to 20% by weight of other fillers and/or diluents, which may be added to reduce the cost of the material or to modify its properties. A particularly preferred diluent is ethylene vinyl acetate.

DETAILED DESCRIPTION

The invention will now be further described with reference to the following specific examples.

EXAMPLE 1

7.2 kg (60% by weight) of polycaprolactone powder with a particle size of 0 to 500$\mu$ and a molecular weight of 50,000; 3.6 kg (30% by weight) of pulverised fuel ash (PFA) with a particle size distribution of 5 to 350$\mu$ and 1.2 kg (10% by weight) of powdered polyethylene vinyl acetate (EVA) with a particle size of 0 to 500$\mu$ were tumbled together to produce a uniform mixture. The mixed powders were consolidated by heating to about 100% and laminated under pressure to two lightweight non-woven polyester scrims (23 grams per square metre each) to produce a sheet with a total weight of 1000 gsm.

When heated in a shoe backpart between upper and lining, the material bonded strongly to these components and was readily formed to the shape of the shoe last. A firm backpart with excellent shape retention characteristics was formed.

The resultant material had a flexural modulus of approximately 520 Mega Pascals (MPa).

EXAMPLE 2

The method according to Example 1 was repeated, with the variation that the powder mixture comprised 6 kg of (50% by weight) of polycaprolactone, 4.2 kg (35% by weight) of PFA and 1.8 kg (15% by weight) of EVA. A sheet material was produced in the same way as in Example 1, but with a final weight of 800 gsm.

The material was formed into a shoe backpart as described in Example 1, and gave excellent shape retention, with greater flexibility than Example 1, having a flexural modulus of approximately 460 MPa.

EXAMPLE 3

The method according to Example 1 was repeated, with the variation that the powder mixture comprised 8.4 kg (70% by weight) of polycaprolactone and 3.6 kg (30% by weight) of PFA. A sheet material was produced in the same way as Example 1, with a final weight of 800 gsm.

The material was formed into a shoe backpart as described in Example 1, and gave excellent shape retention, with flexibility comparable to Example 2, having a flexural modulus of approximately 640 MPa.

EXAMPLE 4

The method according to Example 1 was repeated, with the variation that the powder mixture comprised 7.2 kg (60% by weight) of polycaprolactone and 4.8 kg (40% by weight) of PFA. A sheet material was produced in the same way as Example 1, with a final weight of 800 gsm.

The material was formed into a shoe backpart as described in Example 1, and gave excellent shape retention, having a flexural modulus of approximately 560 MPa.

EXAMPLE 5

The method according to Example 1 was repeated, with the variation that the powder mixture comprised 9.6 kg (80% by weight) of polycaprolactone and 2.4 kg (20% by weight) of PFA, a sheet materials was produced in the same way as Example 1, with a final weight of 800 gsm.

The material was formed into a shoe backpart as described in Example 1, and gave excellent shape retention, having a flexural modulus of approximately 640 MPa.

EXAMPLE 6

The consolidated powder mixture of Example 1 was laminated on one side to a non-woven lining material, for example Aquiline, an impregnated non-woven fibrous material sold by Emhart Materials U.K. Ltd.; and on the other side to a 23 gsm non-woven polyester fabric, to produce a sheet material having a total weight of 1050 gsm.

The sheet material produced was suitable for use as a unit counter. When moulded into a shoe backpart, the material bonded strongly to the shoe upper and was readily formed to the shape of the shoe last. A firm backpart with excellent shape retention characteristics is formed.

COMPARISON I

Polycaprolactone powder with a particle size of 0 to 500$\mu$ and a molecular weight of 50,000, was consolidated by heating to about 100° C. and laminated under pressure to two lightweight non-woven polyester scrims (23 grams per square metre each) to produce a sheet with a total weight of 1400 gsm.

The resultant material had a flexural modulus of approximately 460 MPa.

COMPARISON II

A commercially available polycaprolactone/PVC reinforcing material according to European patent application no.183,912 U.S. Pat. No. 4,717,496, sold under the name Rhenoflex 3000 by Rhenoflex was modified by removing the scrims. The material was then processed in a similar manner to the materials according to the invention.

The resultant material had a flexural modulus of 520 MPa.

Table of results of Examples

| Example | % by Weight polycaprolactone | % by Weight PFA | % by Weight EVA | Flexural Modulus Mega Pascals |
|---|---|---|---|---|
| Comparison (I) | 100 | — | — | 460 |
| Comparison (II) | 60 | 40 | (PVC filler) | 520 |
| 1,6 | 60 | 30 | 10 | 520 |
| 2 | 50 | 35 | 15 | 460 |
| 3 | 70 | 30 | — | 640 |
| 4 | 60 | 40 | — | 560 |
| 5 | 80 | 20 | — | 640 |

From this table, it can be seen that the highest flexural modulus (greater stiffness) is achieved in Examples 3 and 5, and that the flexural modulus is reduced by the addition of ethylene vinyl acetate.

For certain applications, the maximum possible flexural modulus may not be required, and the reduction in flexural modulus may be acceptable, in view of the savings in cost, by using an additive such as ethylene vinyl acetate.

I claim:

1. A reinforcing material which comprises an E-polycaprolactone binder in admixture with a filler, said filler being pulverized fuel ash, said mixture comprising from 50 to 95% by weight of polycaprolactone, from 5 to 45% by weight of pulverized fuel ash and from 0 to 10% by weight of other fillers and/or diluents and wherein said polycaprolactone has as molecular weight of 40,000 to 60,000.

2. A material according to claim 1 which comprises from 60 to 90% by weight of polycaprolactone, from 10 to 30% by weight of pulverised fuel ash and from 0 to 10% by weight of other fillers and/or diluents.

3. A material according to claim 1 wherein said polycaprolactone has a particle size in the range of 50 to 500$\mu$.

4. A material according to claim 3 wherein said polycaprolactone has a particle size in the range of 100 to 400$\mu$.

5. A material according to claim 1 wherein said polycaprolactone has a molecular weight of approximately 50,000.

6. A material according to claim 1 wherein said pulverised fuel ash has a particle size below 350$\mu$.

7. A material according to claim 6 wherein said pulverised fuel ash has a particle size distribution in the range of 5 to 350$\mu$.

8. A material according to claim 2 wherein said polycaprolactone has a molecular weight of approximately 50,000.

* * * * *